H. W. SEELY.
AUTOMOBILE JACK.
APPLICATION FILED MAR. 30, 1912.

1,042,154.

Patented Oct. 22, 1912.
2 SHEETS—SHEET 1.

Witnesses
Wm H Mulligan
C. C. Hines

Inventor
H. W. Seely
By Victor J. Evans
Attorney

H. W. SEELY.
AUTOMOBILE JACK.
APPLICATION FILED MAR. 30, 1912.
1,042,154.
Patented Oct. 22, 1912.
2 SHEETS—SHEET 2.
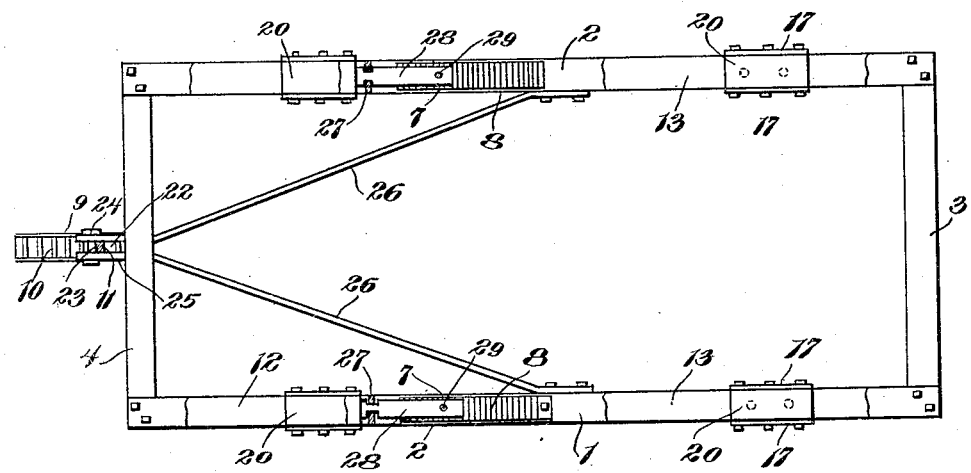
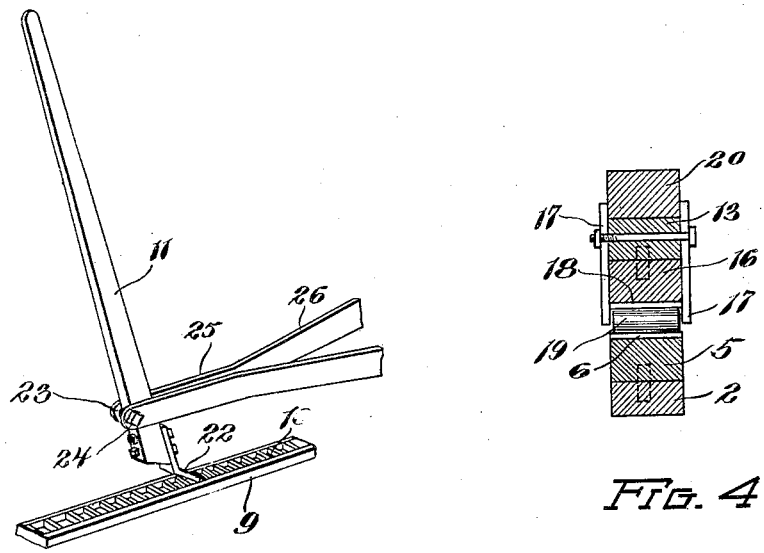
Inventor
H. W. Seely
By Victor J. Evans
Attorney
Witnesses

UNITED STATES PATENT OFFICE.

HERBERT W. SEELY, OF SELIGMAN, ARIZONA.

AUTOMOBILE-JACK.

1,042,154. Specification of Letters Patent. Patented Oct. 22, 1912.

Application filed March 30, 1912. Serial No. 687,332.

*To all whom it may concern:*

Be it known that I, HERBERT W. SEELY, a citizen of the United States, residing at Seligman, in the county of Yavapai and State of Arizona, have invented new and useful Improvements in Automobile-Jacks, of which the following is a specification.

This invention relates to an automobile jack designed especially for use in garages, whereby an automobile which is being stored for any material period may be lifted and held out of contact with the floor, to relieve the tires from strain or to permit repairs and other operations to be readily and conveniently performed.

The main object of the invention is to provide a simple, inexpensive and effective device of this character by which the automobile may be easily lifted and firmly supported, and as easily and conveniently lowered to the ground, the construction being such that the apparatus may be readily operated by one man and without material expenditure of time and labor.

The invention consists of the features of construction, combination and arrangement of parts, hereinafter fully described and claimed, reference being had to the accompanying drawings, in which:—

Figure 1:
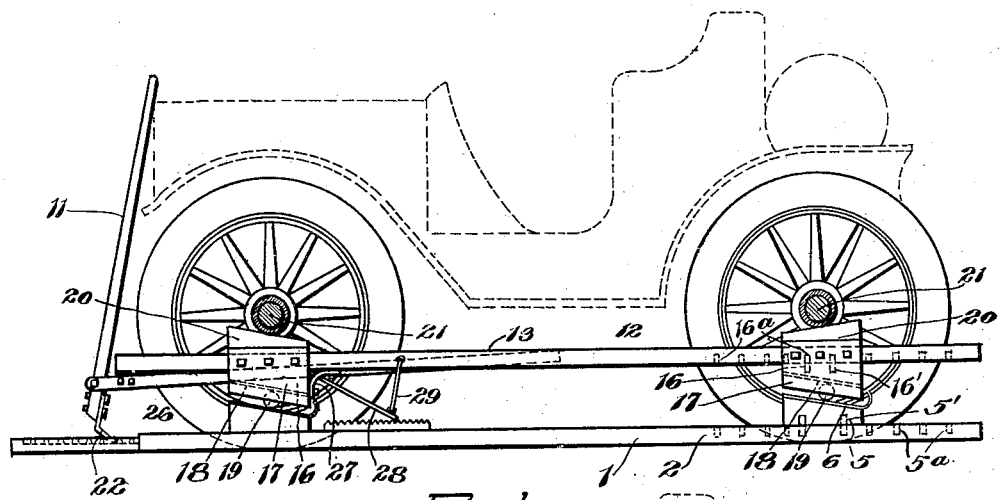
Figure 2:
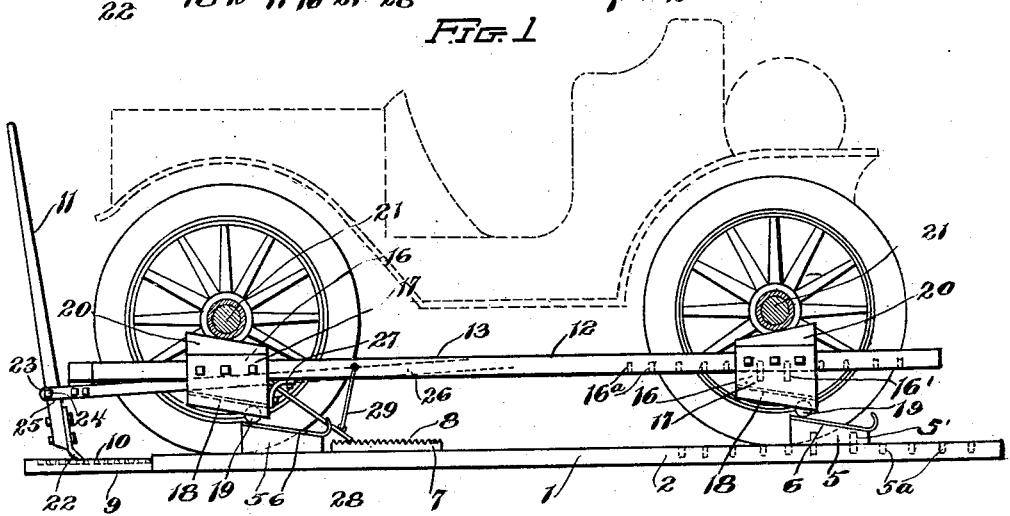
Figure 3:
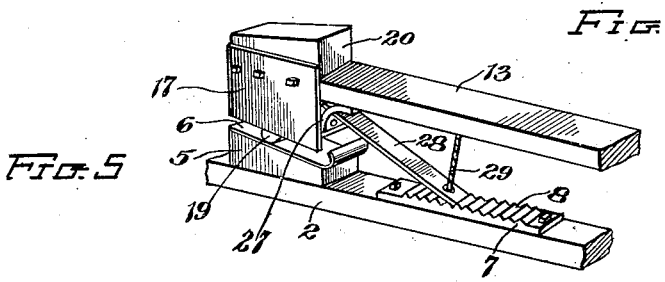

Figure 1 is a side elevation of the jack, showing the position of the parts and adjacent wheels of the automobile in position for raising the automobile. Fig. 2 is a similar view showing the automobile raised clear of the floor. Fig. 3 is a top plan view of the jack, with parts broken away to better show the construction. Fig. 4 is a vertical transverse section on the line 4—4 of Fig. 1. Fig. 5 is a detail perspective view showing the construction of the retaining rack and detent. Fig. 6 is a similar view showing the construction of the fulcrum rack, lever and mode of applying the latter to the draft bars.

Referring to the drawings, 1 designates a base frame, adapted to rest upon the floor of the garage or storage house, and comprising a pair of parallel longitudinal bars 2 connected by cross pieces 3 and 4. Secured to the bars 2 adjacent their opposite ends are opposite pairs of wedge-shaped lower track blocks 5, having their upper faces sloping upwardly and forwardly, as shown. These blocks are preferably made of wood and have their upper faces provided with metallic wear plates 6. Secured to one of the bars 2 immediately in rear of the forward block 5 is a plate 7 provided with a series of ratchet teeth 8, constituting one element of a locking device, as hereinafter described. Also secured to the front cross rail 4 of the base frame is a metallic bar 9 having teeth or notches 10 adapted to be engaged by the lower end of a draft lever 11.

Arranged above the base frame 1 is a similarly constructed supporting frame 12 comprising a pair of side bars 13 connected by cross bars 14 and 15. Secured to said side bars 13 adjacent their ends are depending pairs of wedge-shaped upper track blocks 16 disposed above the companion blocks 5 and having their faces sloping or inclined in the opposite direction thereto. Fixed to each bar 13 on the opposite sides of the block 16 are metallic retaining plates 17, which have their upper edges projecting above the bar and their lower edges projecting below the block. The lower faces of the blocks 16 are provided with metallic wear plates 18, and arranged to travel upon the opposing faces of each pair of upper and lower wedge-shaped blocks are anti-friction rolls 19 which are held from lateral displacement by the depending lower edges of the plates 17. Wedge-shaped depending supporting blocks 20 are adapted to be placed upon the upper surfaces of the bars 13 above the blocks 16 and between the upwardly projecting edges of the plates 17 and to be disposed beneath the ends of the axles 21 of the automobile to be lifted. The upper sloping faces of the blocks at the opposite ends of the frame are arranged to incline downwardly and inwardly, or toward the center of the frame, so that the automobile will be maintained in position by its weight against any tendency to roll off the jack. Preferably the blocks 5 and 16 are provided with dowel pins 5' and 16' to engage dowel seats 5ª and 16ª in the bars 1 and 12 whereby said blocks are made adjustable on the bars with relation to the front blocks 5 and 16 for supporting vehicles of different length.

In practice, the automobile to be elevated is run into the spaces between the bars of the frame and the wedge-blocks 20 inserted under the axles thereof, after which the frame 12 is moved forwardly, so that the blocks 16 will travel up on the blocks 5, whereby the automobile will be elevated, the rollers 19 reducing the friction of motion and enabling the frame 12 to be more easily operated. The lever 11 is provided for shifting the frame 12, and is provided at its lower end with a shoe or projection 22 to engage any one of the teeth or notches 10 of the purchase bar 9. The lever 11 is provided in one of its edges with a recess 23 adapted to engage a cross pin or bolt 24 carried by the straight and parallel forward ends 25 of a pair of draft bars 26, which are suitably secured to the forward cross piece 14 of the frame 12 and project rearwardly in divergent relation therefrom and are secured at their rear ends to the side bars 13. The lever 11 is accordingly adapted for detachable pivotal engagement with a stirrup formed by the parts 24 and 25 and may be successively engaged with the teeth or notches 10 and rocked to impart an intermittent forward motion to the frame 12 until the automobile has been elevated to the limit afforded by the track blocks.

Secured to one of the bars 13 and the adjacent forward block 16 is a hinge bracket 27 to which is hinged or pivoted a locking dog or detent 28 which is adapted to engage the ratchet teeth 8 of the locking bar 7. It will thus be understood that the lever 11 may be engaged with the first bar or notch 10 to pull the frame 12 forward a certain distance, in which it will be locked by the detent 28, the lever then adjusted into engagement with the second notch or tooth 10 and operated to draw the frame 12 forward a greater distance, and so on until the full forward travel of said frame is obtained, by which the automobile is elevated clear of the floor, the detent 28 successively interlocking with the teeth 8 to hold said frame 12 from backward movement. The automobile may be quickly and conveniently elevated in this manner so that its tires will be lifted off the floor and the weight of the machine transferred from the tires to the jack, thus preventing the damage occurring to the tires of an automobile which is left standing for any considerable period. When the machine is so elevated convenient access may also be obtained to the frame thereof and parts carried thereby for convenience in cleaning, oiling or making repairs. When it is desired to lower the automobile, the lever 11 is detached and the detent 28 released and held elevated, whereupon the frame 12 will travel by gravity under the weight of the machine down the inclined surfaces of the blocks 5 until the wheels can rest upon the ground surface. For convenience in retracting the detent 28, a chain or other pull connection 29 may be employed and extended to any suitable point for operation.

From the foregoing description, taken in connection with the drawings, the construction and mode of use of my improved automobile jack will be readily understood, and it will be seen that it provides a device of the stated character which is inexpensive of production and efficient in use, and which may be employed with advantage to save wear and tear upon the tires and wheels when the machine is stored, as well as to enable the machine to be elevated for the purpose of securing more convenient access to the frame and other parts ordinarily difficult to reach.

Having thus described the invention, what I claim as new is:

1. An automobile jack comprising a base frame, a top frame movable longitudinally thereof and normally arranged below the level of the axle of the vehicle to be raised, wedge blocks adapted to be interposed between said top frame and the axles, engaging inclined track surfaces between said mechanism, means for moving the top frame forward intermittently, means for locking said top frame in each of its forward positions of movement, and means for rendering said locking means inoperative.

2. An automobile jack comprising a base frame provided with a rack plate, an endwise movable top frame, engaging inclined track surfaces between the said frames, a stirrup carried by the top frame, a lever adapted for detachable engagement with the rack plate and stirrup for moving the top frame intermittently forward, locking mechanism for securing the top frame in each of its positions of adjustment, and means for rendering said locking means inoperative.

3. An automobile jack comprising a base frame, a top frame adapted to engage under the axles of the vehicle, blocks carried by said top frames for engagement with the axles, said blocks being arranged in pairs at opposite ends of the frame with the engaging surfaces of the respective pairs of blocks inclining downward toward the center of the frame, engaging surfaces on the frames for raising and lowering the top frame when said frame is moved forwardly or rearwardly, and means for holding the same in a forwardly adjusted position.

4. An automobile jack comprising a base frame, a top frame provided with downwardly and inwardly inclined surfaces to engage under the axles of a vehicle, engaging surfaces between said frames operative to raise and lower the top frame on its forward and rearward movements, rack teeth at one end of the base frame, a draft connection pivoted to the top frame, a lever slidably and pivotally engaging said draft connection and having a toothed lower end for operation with said rack teeth, and means for securing said top frame against rearward movement on each forward step of motion thereof.

5. An automobile jack comprising a base frame, a top frame having downwardly and inwardly inclined surfaces to engage under the axles of a vehicle, means for moving the top frame forward by an intermittent step by step motion, blocks carried by and disposed between said frames and having inclined surfaces, anti-friction rolls disposed between said surfaces, the latter being arranged for raising and lowering the top frame when said frame is moved forwardly or rearwardly, stops upon said blocks to retain the rolls from lateral or downward displacement, and means for holding the top frame in any of its positions of adjustment.

6. An automobile jack comprising a base frame, a top frame provided with downwardly and inwardly inclined surfaces to engage under the axles of a vehicle, front and rear coöperating pairs of blocks carried by the frames and having inclined surfaces, the coöperating pairs of blocks at one end of the frame being adjustable with relation to the blocks at the opposite ends thereof, said blocks being provided with inclined surfaces, anti-friction rolls between said surfaces, means for moving the top frame forward by step by step motion, and means for holding the same against backward movement in its positions of adjustment.

7. An automobile jack comprising a base frame, blocks mounted upon said frame and provided with downwardly and rearwardly inclined surfaces, an upper frame, coöperating blocks upon the upper frame having downwardly and inwardly inclined upper faces and inwardly and upwardly inclined lower faces, anti-friction rolls between the juxtaposed faces of the blocks, means for moving the upper frame forward by an intermittent step by step motion, and means for securing it in adjusted position.

8. An automobile jack comprising a base frame, a longitudinally movable top frame, inclined blocks carried by said frame, antifriction bearings between the upper and lower blocks, said bearings being arranged to traverse the inclined faces of the blocks to raise and lower the upper frame on its forward and rearward movements, pawl and ratchet mechanism adapted for intermittently moving the top frame forward, rack teeth upon the base frame, a dog pivoted to the top frame to engage said rack teeth and a flexible retracting member secured to the dog, whereby the dog may be retracted.

In testimony whereof I affix my signature in presence of two witnesses.

HERBERT W. SEELY.

Witnesses:
OSCAR WILLETT,
M. M. CHAMBERS.